April 25, 1967 — R. L. PALMER — 3,315,362
ATTACHMENT FOR A TELESCOPIC SIGHT
Filed Aug. 5, 1964

INVENTOR.
Richard L. Palmer,
BY Trask, Jenkins & Hanley
Attorneys.

United States Patent Office 3,315,362
Patented Apr. 25, 1967

3,315,362
ATTACHMENT FOR A TELESCOPIC SIGHT
Richard L. Palmer, P.O. Box 1257,
Sierra Vista, Ariz. 85635
Filed Aug. 5, 1964, Ser. No. 387,600
5 Claims. (Cl. 33—50)

This invention relates to an attachment for a telescopic sight, and more particularly to an extension for mounting on such a sight for facilitating the use of said sight.

The use of telescopic sights on weapons is well known and widely practiced. Certain problems are inherent in the use of these sights, however, and these problems have tended to make many hunters and sportsmen refrain from using them. The end of the sight and the user's eye are normally spaced from each other which permits light to enter the sighting end of the sight and make viewing through the sight difficult. Light entering the sighting end of the sight also causes side reflections along the length of the sight if the user does not have the sight in perfect focused alignment with his eye. The user must also have his aiming eye at the proper axial distance from the sight. If his eye is either too far or too close from the sight, he will have less than a full field of view through it. It is also difficult to quickly bring the sight up to a firing or sighting position with the sight aligned properly.

It is therefore the general object of this invention to provide an attachment for a telescopic sight which will overcome the problems just discussed. More specifically, it is an object of the invention to provide an attachment for a telescopic sight which will prevent light from entering the sight at the sighting end thereof, which will assure the proper axial spacing between the user's eye and the sight, which will eliminate side reflections within the sight, which will permit the user to quickly bring the sight into aimed alignment, and which can be used by either left or right handed persons. It is a further object of the invention to provide an attachment for a telescopic sight which will provide a cushioned element interposed between said sight and the user's face.

In the preferred form of the invention, there is provided a unitary attachment for a telescopic sight. Said attachment, which is formed from a resilient material, has a sleeve adapted to have one of its ends received over the sighting end of a telescopic sight to project rearwardly therefrom. The opposite end of the sleeve is continuous with an axially offset eye-piece having its end remote from the sleeve at an oblique angle to the sleeve axis to conform to the contour of the eye socket of the person using the attachment so that said eye-piece can fit into the user's eye socket and prevent any light from entering the sighting end of the attachment. The resilient construction of the attachment cushions the user's eye socket against any recoil from the weapon upon which the sight and attachment are mounted. An inwardly projecting shoulder is formed in the attachment to define a reduced diameter opening in the line of sight through said attachment to provide a means of quickly bringing the attachment and sight into the proper aimed position with a full field of view.

Other objects and features of the invention will become apparent from the more detailed description which follows and from the accompanying drawings, in which.

Figure 1:
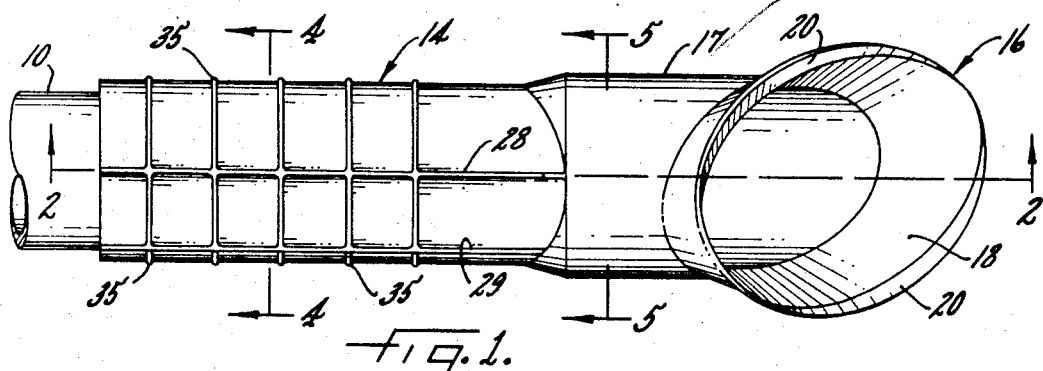
FIG. 1 is a plan view of an attachment embodying the invention, and showing said attachment mounted on a telescopic sight.

As shown in FIG. 1, my invention is adapted to fit over the sighting end of a telescopic sight 10 which is normally fitted with an eye-piece lens 12. The attachment shown in FIGS. 1–5 is formed as a unitary molding of a resilient material, conveniently a rubber having a durometer reading of about 45. It comprises an elongated sleeve 14 adapted to fit over the sighting end of the telescopic sight 10 and to project rearwardly therefrom. Because of its resilient construction, the sleeve 14 can be bindingly retained on sights of different diameters.

The opposite end of the sleeve 14 is integral with a generally cylindrical eye-piece 16 axially offset from said sleeve. Said eye-piece comprises a cylindrical wall 17 interconnecting the sleeve 14 and an outwardly flaring wall 18 provided with upstanding lips 20 along its upper and lower edges. The terminal end of the eye-piece is at an angle to the axis of the attachment in the order of about 40° whereby the end of said eye-piece will have an elliptical cross-section. With the eye-piece 16 offset from the axis of the sleeve 14 and the terminal edge of the wall 18 at an angle to said axis, as a person brings his head into the normal tilted position against the gun stock, the eye-piece will fit flush against his face with the lips 20 engaging his brow and cheek and thereby prevent light from entering the eye-piece. The resiliency of the eye-piece will prevent any damaging recoil from the gun being transferred to the sight 10 and attachment to the user's eye-socket and face.

Figure 2:
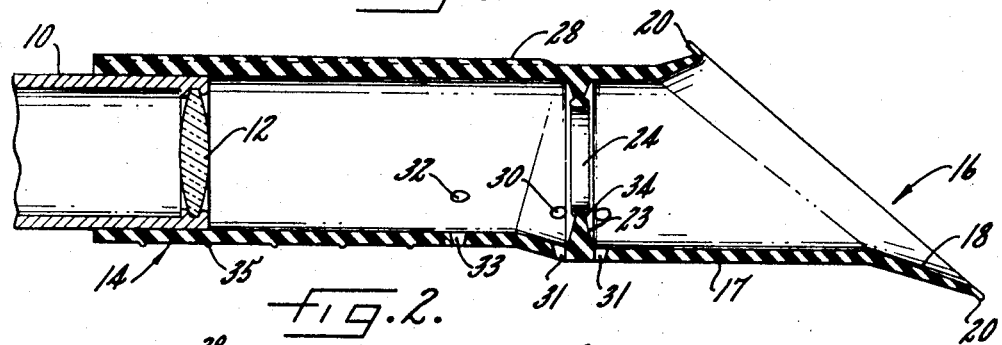
FIG. 2 is an axial section taken on the line 2—2 of FIG. 1.
Figures 3, 4, 5:
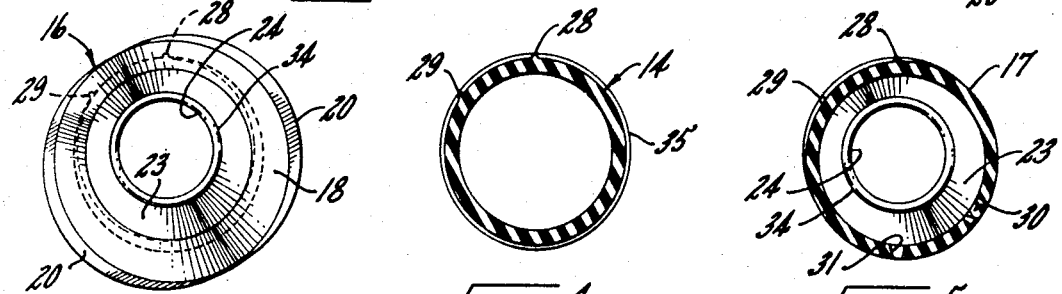
FIG. 3 is an end elevation of the sighting attachment shown in FIG. 1.
FIG. 4 is a transverse section taken on the line 4—4 of FIG. 1.
FIG. 5 is a transverse section taken on the line 5—5 of FIG. 1.

As shown in FIG. 2, an inwardly extending projection 23 is formed in the eye-piece wall 17 immediately adjacent the sleeve 14. Said projection defines an apertured opening 24 in the attachment of the smaller diameter than the internal diameters of the sleeve 14 and eye-piece 16 to permit the sight and attachment to be brought quickly into aimed alignment wherein the cross hairs or other aiming devices within the sight 10 (not shown) are brought on target.

As will be apparent, in order for the eye-piece to fit against the user's eye socket properly, the longer side of the eye-piece will have to be disposed toward the outer portion of the user's face. That is, it will have to be disposed to the right (in a sighting position) for a right-handed shooter and to the left for a left-handed shooter. To facilitate obtaining the proper rotational orientation on the sight, a pair of axially extending ribs 28 and 29 are formed on the sleeve 14, said ribs being spaced apart about 55° around the circumference of the sleeve. In the embodiment shown in FIGS. 1–4, when the rib 28 is oriented along the top of the sight 10, the eye-piece 16 will be properly positioned for a right-handed shooter. Conversely, by rotating the attachment on the sight 10 until the rib 29 is disposed along the top of said sight, the said eye-piece will be properly oriented for a left-handed shooter.

A pair of easily removable knockout plugs 30 are formed in each of the sleeve 14 and eye-piece wall 17 on the opposed sides of the projection 23 and extend partially into said projection. The plugs are circumferentially spaced around the walls in diametrically opposed relationship to the ribs 28 and 29 and may be selectively removed to provide weep holes 31. Desirably, another set of circumferentially spaced removable knockout plugs 32 in axial alignment with the plugs 30 are formed forwardly of said projection in the sleeve 14 and can be removed to provide weep holes 33. Desirably, the plugs 30 and 32 that are removed are those opposite whichever rib 28 or 29 is oriented along the top of the attachment so that the weep holes 31 and 33 will be disposed along the bottom of said attachment. In FIG. 2, the plugs 30 and 32 diametrically opposite the ribs 28 have been removed while the plugs 30 and 32 diametrically opposite the ribs 29 are still in position. A forwardly and rearwardly projecting bead 34 is also formed on the projection 23 to further aid in preventing any moisture that might enter the attachment from gravitating toward the sight 10.

Because of their different physical structures and different techniques of aiming, different persons using telescopic sights position their aiming eyes at different distances from the sight 10. In order to insure that the person's eye is the same distance from the sight 10 every time the weapon upon which the sight is mounted is thrown to his shoulder, a series of circumferentially extending, axially spaced ribs 35 are formed on the outer wall of the sleeve 14 adjacent its end remote from the eye-piece 16. Said ribs serve as indicia for determining the degree to which the sleeve is slipped over the sighting end of the sight 10 so that the user will be assured that when his eye-socket is flush against the eye-piece wall 18, his eye will always be the same distance from the sight eye-piece 12 creating a perfect focus.

Figure 6:
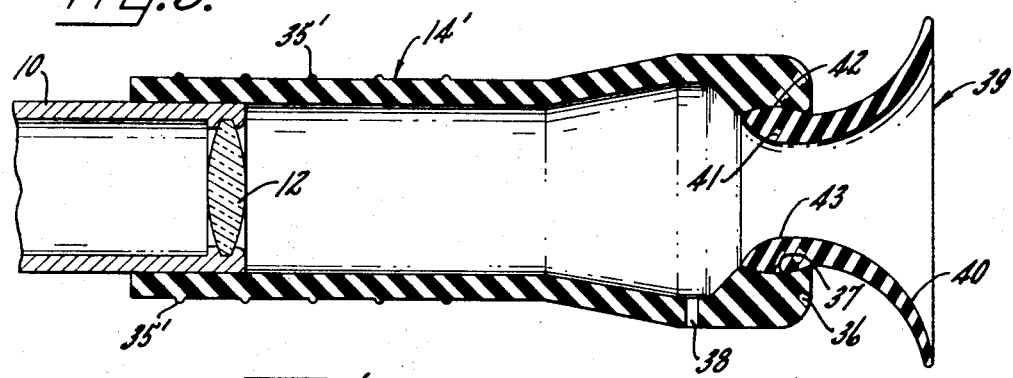
FIG. 6 is an axial section of a modified form of the invention.

Another embodiment of the invention is illustrated in FIG. 6 and comprises a sleeve 14' formed of resilient material and adapted to be bindingly fit over the sighting end of the telescopic sight 10 fitted with an eye-piece lens 12. Conveniently, the sleeve 14' has a plurality of circumferentially extending, axially spaced ribs 35' serving as indicia for determining the amount that the attachment is slipped over the sight 10.

At its opposite end, the sleeve has an inwardly projecting end wall 36 defining an annular opening having a concave face 37. Desirably, a weep hole 38 is formed in the sleeve 14' adjacent the end wall 36. A funnel-shaped eye-piece 39 formed from a resilient material, conveniently rubber, is mounted on the sleeve 14'. Said eye-piece comprises a flared wall 40 continuous at its forward end with a neck 41. The outer face of said neck is convex, as at 42, and is receivable against the concave face 37 of the sleeve end wall 36 so that the mating faces 37 and 42 define a universal ball and socket joint which permits the eye-piece to be swiveled with respect to the sleeve 14' for adjusting the angle of the eye-piece with respect to the axis of said sleeve so that said eye-piece can be properly fitted against the user's face. The inner wall 43 of the neck 41 defines a reduced diameter opening in the line of sight through the attachment so that the attachment and sight can be brought quickly into aimed alignment wherein the cross hairs or other aiming devices in the sight are brought on target.

Since the eye-piece 39 is rotatable with respect to the sleeve 14', the embodiment shown in FIG. 6 is not provided with the indicia ribs 28 and 29 shown in FIG. 1 for rotatably aligning the attachment with respect to the sight 10.

While my invention has been described for use with telescopic sights, it is to be understood, however, that it can also be mounted on other optical devices, such as telescopes, binoculars, and the like, to facilitate the use of such devices.

I claim:

1. An attachment for a telescopic sight comprising a sleeve having one of its ends receivable on the sighting end of a telescopic sight and projecting rearwardly therefrom, a cylindrical eye-piece at the opposite end of said sleeve terminating at its outer end in an outwardly flared annular wall, said sleeve projecting substantially beyond said eye-piece, an annular inwardly projecting shoulder adjacent the juncture of said sleeve and eye-piece having an axially extending bead on its inner edge defining a reduced diameter opening in the line of sight through said attachment, said sleeve and eye-piece having openings formed therein on opposite sides of said shoulder inwardly from the end of said eye-piece, and said eye-piece being formed of a resilient material whereby said outwardly flared wall can be pressed against and conform to the eye-socket of a person using the attachment.

2. An attachment for a telescopic sight formed as a unitary member and comprising a sleeve having one of its ends receivable on the sighting end of a telescopic sight and projecting rearwardly therefrom, circumferentially spaced indicia on said sleeve for rotatably aligning the attachment on said sight, a cylindrical eye-piece at the opposite end of said sleeve axially offset therefrom and terminating at its outer end in an outwardly flared annular wall at an oblique angle to said sleeve to provide the outer end of said eye-piece with an elliptical cross-section, said sleeve projecting substantially beyond said eye-piece and annular means adjacent the juncture of said sleeve and eye-piece defining a reduced diameter opening in the line of sight through said attachment, and said attachment being formed of a resilient material whereby said outwardly flared wall can be pressed against and conform to the eye-socket of a person using the attachment.

3. An attachment for a telescopic sight comprising a sleeve having one of its ends receivable on the sighting end of a telescopic sight and projecting rearwardly therefrom, a cylindrical eye-piece connected to the opposite end of said sleeve through a universal joint and terminating at its outer end in an outwardly flared annular wall, said sleeve projecting substantially beyond said eye-piece and annular means adjacent the juncture of said sleeve and eye-piece defining a reduced diameter opening in the line of sight through said attachment, and said eye-piece being formed of a resilient material whereby said outwardly flared wall can be pressed against and conform to the eye-socket of a person using the attachment.

4. An attachment for a telescopic sight comprising a sleeve having one of its ends receivable on the sighting end of a telescopic sight and projecting rearwardly therefrom, the opposite end of said sleeve having an annular opening provided with a concave face, a cylindrical eye-piece having a neck portion at its inner end provided with a convex outer face movably supported against said concave face whereby said eye-piece can be swiveled with respect to said sleeve, said eye-piece terminating at its outer end in an outwardly flared annular wall, said sleeve projecting substantially beyond said eye-piece and annular means adjacent the juncture of said sleeve, an eye-piece defining a reduced diameter opening in the line of sight through said attachment, and said eye-piece being formed of a resilient material whereby said outwardly flared wall can be pressed against and conform to the eye-socket of a person using the attachment.

5. The invention as set forth in claim 4 in which said annular means comprises the inner wall of said neck portion.

References Cited by the Examiner

UNITED STATES PATENTS

| | | | |
|---|---|---|---|
| 737,872 | 9/1903 | Saegmuller | 88—32 |
| 1,145,022 | 7/1915 | Keuffel | 88—32 |
| 1,518,985 | 12/1924 | Kretschmer | 88—1 |
| 2,968,099 | 1/1961 | Peters | 33—50 |
| 3,183,594 | 5/1965 | Panunzi | 33—50 |
| 3,205,580 | 9/1965 | Osborn | 33—50 |

LEONARD FORMAN, *Primary Examiner.*

J. M. FREED, *Assistant Examiner.*